(12) United States Patent
Wimpy et al.

(10) Patent No.: US 12,113,664 B2
(45) Date of Patent: *Oct. 8, 2024

(54) SCALABLE SECURITY INFORMATION AND EVENT MANAGEMENT (SIEM) FRAMEWORK

(71) Applicant: CenturyLink Intellectual Property LLC, Broomfield, CO (US)

(72) Inventors: Michael David Wimpy, Marshall, VA (US); Andrey Konczal, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,117

(22) Filed: Nov. 1, 2023

(65) Prior Publication Data
US 2024/0064057 A1 Feb. 22, 2024

Related U.S. Application Data

(63) Continuation of application No. 18/128,701, filed on Mar. 30, 2023, now Pat. No. 11,811,510, which is a continuation of application No. 17/976,371, filed on Oct. 28, 2022, now Pat. No. 11,621,885, which is a continuation of application No. 17/561,345, filed on Dec. 23, 2021, now Pat. No. 11,489,718, which is a continuation of application No. 16/919,841, filed on Jul. 2, 2020, now Pat. No. 11,218,359, which is a continuation of application No. 16/392,986, filed on Apr. 24, 2019, now Pat. No. 10,708,123.

(60) Provisional application No. 62/799,704, filed on Jan. 31, 2019.

(51) Int. Cl.
| | |
|---|---|
| H04L 41/069 | (2022.01) |
| G06F 21/60 | (2013.01) |
| H04L 41/5074 | (2022.01) |
| H04L 69/04 | (2022.01) |

(52) U.S. Cl.
CPC .......... *H04L 41/069* (2013.01); *G06F 21/602* (2013.01); *H04L 41/5074* (2013.01); *H04L 69/04* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 8,079,081 | B1* | 12/2011 | Lavrik | H04L 41/069 726/22 |
| 8,156,553 | B1* | 4/2012 | Church | G06Q 10/06 709/224 |
| 9,069,930 | B1* | 6/2015 | Hart | H04L 63/1408 |
| 2014/0215621 | A1* | 7/2014 | Xaypanya | H04L 63/145 726/23 |
| 2017/0286520 | A1* | 10/2017 | Christian | G06F 16/258 |
| 2019/0095508 | A1* | 3/2019 | Porath | G06F 16/34 |
| 2020/0336359 | A1 | 10/2020 | Wimply | |
| 2022/0116264 | A1 | 4/2022 | Wimpy | |

(Continued)

*Primary Examiner* — Atta Khan

(57) ABSTRACT

A framework for security information and event management (SIEM), the framework includes a first data store; a data router; one or more parsing mechanisms; one or more correlation machines; and one or more workflow engines, wherein said framework performs SIEM on behalf of multiple subscribers to said framework.

27 Claims, 7 Drawing Sheets

(56) References Cited

U.S. PATENT DOCUMENTS

2023/0057468 A1    2/2023    Wimpy
2023/0239198 A1    7/2023    Wimpy

* cited by examiner

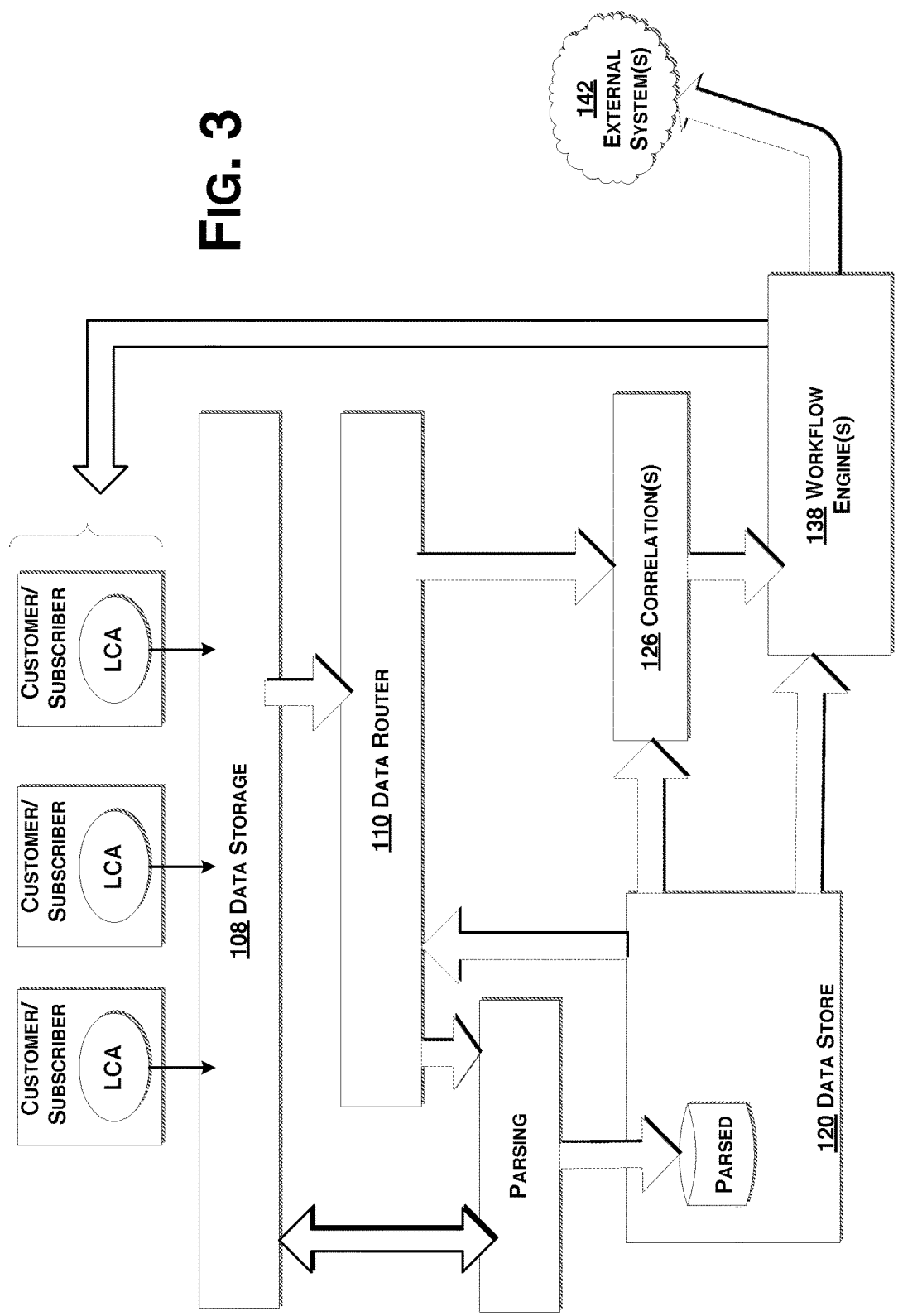

SCALABLE SECURITY INFORMATION AND EVENT MANAGEMENT (SIEM) FRAMEWORK

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to security information and event management ("SIEM"). More specifically, this invention relates to scalable frameworks supporting security information and event management.

SUMMARY

The present invention is specified in the claims as well as in the description.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a framework for security information and event management (SIEM), the framework including: a first data store. The framework may also include a data router. The framework may also include one or more parsing mechanisms. The framework may also include one or more correlation machines. The framework may also include one or more workflow engines. The framework may also include where the framework performs SIEM on behalf of multiple subscribers to the framework. The framework may also include where the first data store is constructed and adapted to store encrypted, compressed log data obtained from at least some of the multiple subscribers. The framework may also include where the data router is constructed and adapted to notify the one or more parsing mechanisms that encrypted, compressed log data are present on the first data store. The framework may also include where the one or more parsing mechanisms are constructed and adapted to obtain encrypted, compressed log data from the first data store and to decrypt, decompress, and normalize the log data and to store decrypted, decompressed, and normalized log data in a second data store. The framework may also include where the one or more parsing mechanisms are further constructed and adapted to notify the data router that decrypted, decompressed, and normalized log data are present in the second store. The framework may also include where the data router is further constructed and adapted to inform the one or more correlation machines that decrypted, decompressed, and normalized log data are present in the second store, and where the one or more correlations machines are constructed and adapted: to obtain decrypted, decompressed, and normalized log data in the second store, and to apply one or more correlation rules to the decrypted, decompressed, and normalized log data obtained from the second data store to determine one or more correlations, and to put information about the one or more correlations on a correlations queue. The framework may also include where the one or more workflow engines are constructed and adapted to obtain the information about the one or more correlations from the correlations queue and to determine ticket information based on the information about the one or more correlations, and to provide the ticket information to a subscriber of the multiple subscribers. Other embodiments of this aspect include corresponding computer systems, apparatus, and computer programs recorded on one or more computer storage devices, each configured to perform the actions of the methods.

Implementations may include one or more of the following features.

The framework where the data router notifies the one or more parsing mechanisms that data are present on the first data store by putting a message on a parse queue.
The framework where the message includes a simple notification service (SNS) message on the parse queue.
The framework where the data router informs the one or more correlation machines that decrypted, decompressed, and normalized log data are present in the second store by putting a message on a parsed queue.
The framework where the parsed message includes a simple notification service (SNS) message on the parsed queue.
The framework where the first data obtains encrypted, compressed log data obtained from one or more log collection appliances (LCAs) associated with the multiple subscribers.
The framework where each particular LCA is associated with a corresponding particular subscriber of the multiple subscribers.
The framework where the first data store is constructed and adapted to store data for each subscriber separately from data from each other subscriber.
The framework where the data router informs the one or more correlation machines of decrypted, decompressed, and normalized log data present in the second store, based on subscriber-specific criteria.
The framework where the one or more correlation machines include at least one subscriber-dedicated correlation machine.
The framework where each subscriber has a corresponding correlation machine.
The framework where the one or more workflow engines determine the ticket information based on the information about the one or more correlations, and on other information.
The framework where the other information includes information from the second data store and/or information from one or more external systems. Implementations of the described techniques may include hardware, a method or process, or computer software on a computer-accessible medium.
The framework where the ticket information is used to generate and/or cause automated intervention at the subscriber.
The framework where the intervention is provided using one or more APIs on devices on the subscriber's network Another general aspect includes a method operable in a framework for security information and event management (SIEM), the framework supporting SIEM on behalf of multiple subscribers to the framework, the framework having: a first data store; a data router; one or more parsing mechanisms; one or more correlation machines; and one or more workflow engines, where the method includes. The method may also include storing, in the first data, encrypted, compressed log data obtained from at least some of the multiple subscribers. The method may also include the data router notifying the one or more parsing mechanisms that encrypted, compressed log data are present on the first data store. The method may also include the one or more parsing mechanisms obtaining encrypted, compressed log data from the first data store and decrypting, decompressing, and normalizing the log data and storing decrypted, decompressed, and normalized log data in a second data store. The method may also include the one or more parsing mechanisms notifying the data router that decrypted, decompressed, and normalized log data are present in the second store. The method may also include the data router informing the one or more correlation machines that decrypted, decompressed, and normalized log data are present in the second store, and the one or more correlations machines: obtaining decrypted, decompressed, and normalized log data in the second store, and applying one or more correlation rules to the decrypted, decompressed, and normalized log data obtained from the second data store to determine one or more correlations, and putting information about the one or more correlations on a correlations queue. The method may also include the one or more workflow engines obtaining the information about the one or more correlations from the correlations queue and determining ticket information based on the information about the one or more correlations, and providing the ticket information to a subscriber of the multiple subscribers.

Other embodiments of this aspect include corresponding computer systems, apparatus, and computer programs recorded on one or more computer storage devices, each configured to perform the actions of the methods.

Implementations may include one or more of the following features.

The method where the data router notifies the one or more parsing mechanisms that data are present on the first data store by putting a message on a parse queue.

The method where the message includes a simple notification service (SNS) message on the parse queue.

The method where the data router informs the one or more correlation machines that decrypted, decompressed, and normalized log data are present in the second store by putting a message on a parsed queue.

The method where the parsed message includes a simple notification service (SNS) message on the parsed queue.

The method where the first data obtains encrypted, compressed log data obtained from one or more log collection appliances (LCAs) associated with the multiple subscribers.

The method where each particular LCA is associated with a corresponding particular subscriber of the multiple subscribers.

The method where the first data store is constructed and adapted to store data for each subscriber separately from data from each other subscriber.

The method where the data router informs the one or more correlation machines of decrypted, decompressed, and normalized log data present in the second store, based on subscriber-specific criteria.

The method where the one or more correlation machines include at least one subscriber-dedicated correlation machine.

The method where each subscriber has a corresponding correlation machine.

The method where the one or more workflow engines determine the ticket information based on the information about the one or more correlations, and on other information.

The method where the other information includes information from the second data store and/or information from one or more external systems.

The method where the ticket information is used to generate and/or cause automated intervention at the subscriber.

The method where the intervention is provided using one or more APIs on devices on the subscriber's network.

Implementations of the described techniques may include hardware, a method or process, or computer software on a computer-accessible medium.

The above features along with additional details of the invention, are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 3 depicts aspects of the SIEM framework of FIG. 1;

DETAILED DESCRIPTION OF THE PRESENTLY PREFERRED EXEMPLARY EMBODIMENTS

Glossary

As used herein, unless used otherwise, the following terms or abbreviations have the following meanings:

API means application program interface;

SIEM means security information and event management; and

SNS means Simple Notification Service.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

Figure 1:
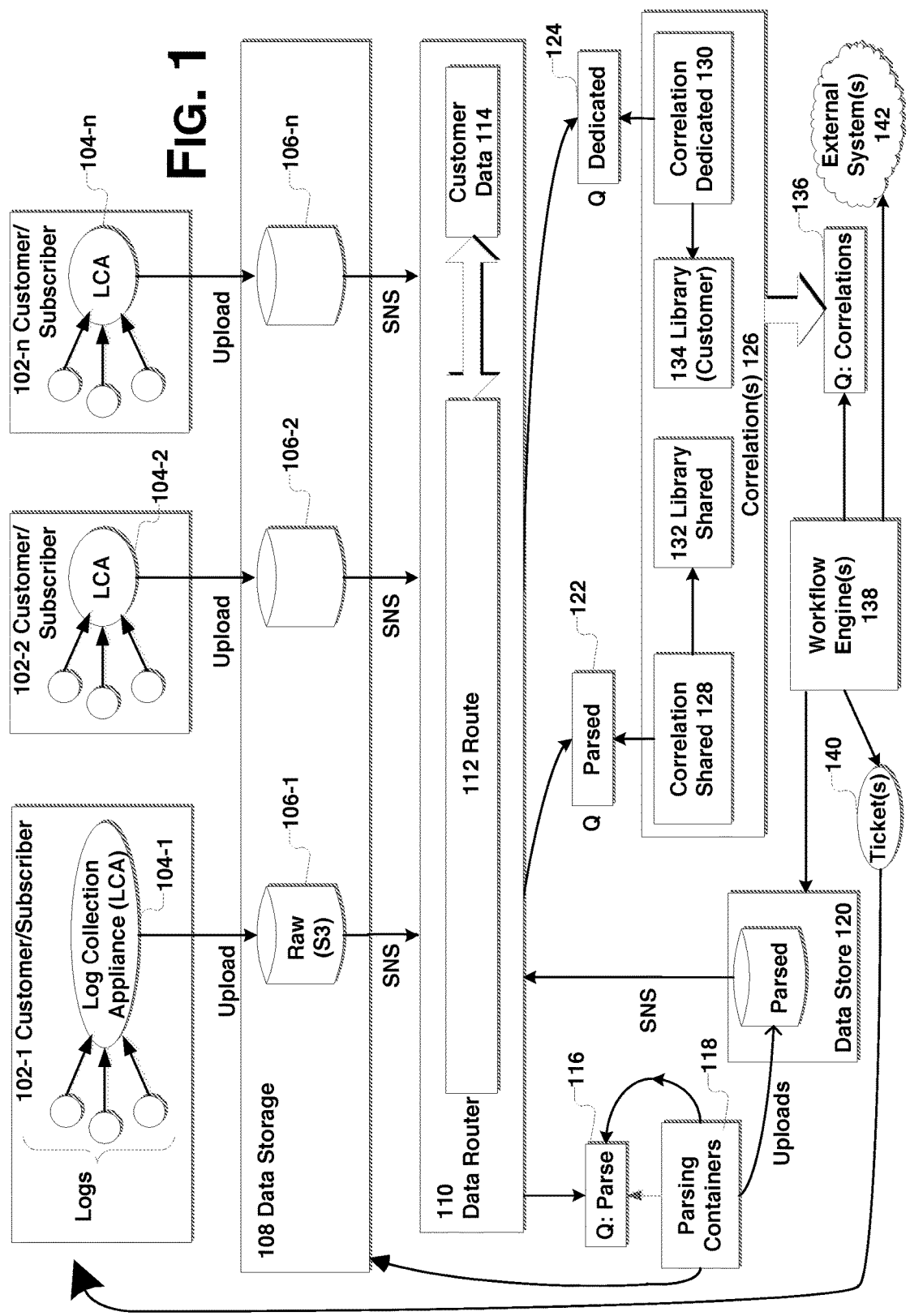
FIG. 1 depicts aspects of a security information and event management (SIEM) framework according to exemplary embodiments hereof.

With reference to FIG. 1, a security information and event management (or SIEM) framework 100 according to exemplary embodiments hereof, supports multiple customers 102-1, 102-2, . . . 102-$n$ (individually and collectively customer 102). A customer may also be referred to as a subscriber or client.

Each customer 102-$j$ has a corresponding log collection appliance (or LCA) 104-$j$. The LCA 104 for a particular customer may be a virtual appliance (e.g., software) installed on that particular customer's network. Thus, e.g., the LCA 104-1 is an appliance (e.g., software) installed on the network of customer 102-1 and configured to collect logs from devices (e.g., hardware and/or software endpoints) on that customer's network, package the logs (as described below), and send the packaged logs to the SIEM framework.

Each customer may configure their devices and system to generate the logs of their choice. The customer may, e.g., configure which endpoint's logs to use as well as the severity level and granularity of the logs. For example, a customer may obtain logs from routers, switches, servers, applications, firewalls, etc.

The LCA 104 at a customer 102 may collect the logs and compress them in periodic intervals. For example, an LCA 104 may collect logs in one minute periods (e.g., in a file per minute), and then compress the collected logs (e.g., using GZIP or the like to obtain 20 to 50 times file reduction). The compressed log file is then encrypted and downloaded to an appropriate data storage (bucket) 106 for that customer. Compressed (and encrypted) log data files may be provided by the various LCAs 104 and stored in data store 108 (which includes one or more data buckets 106) (412, FIG. 4B). Preferably each LCA (and thus each customer) gets its own data bucket 106, so that customer data may be segregated (by bucket).

Figure 4A:
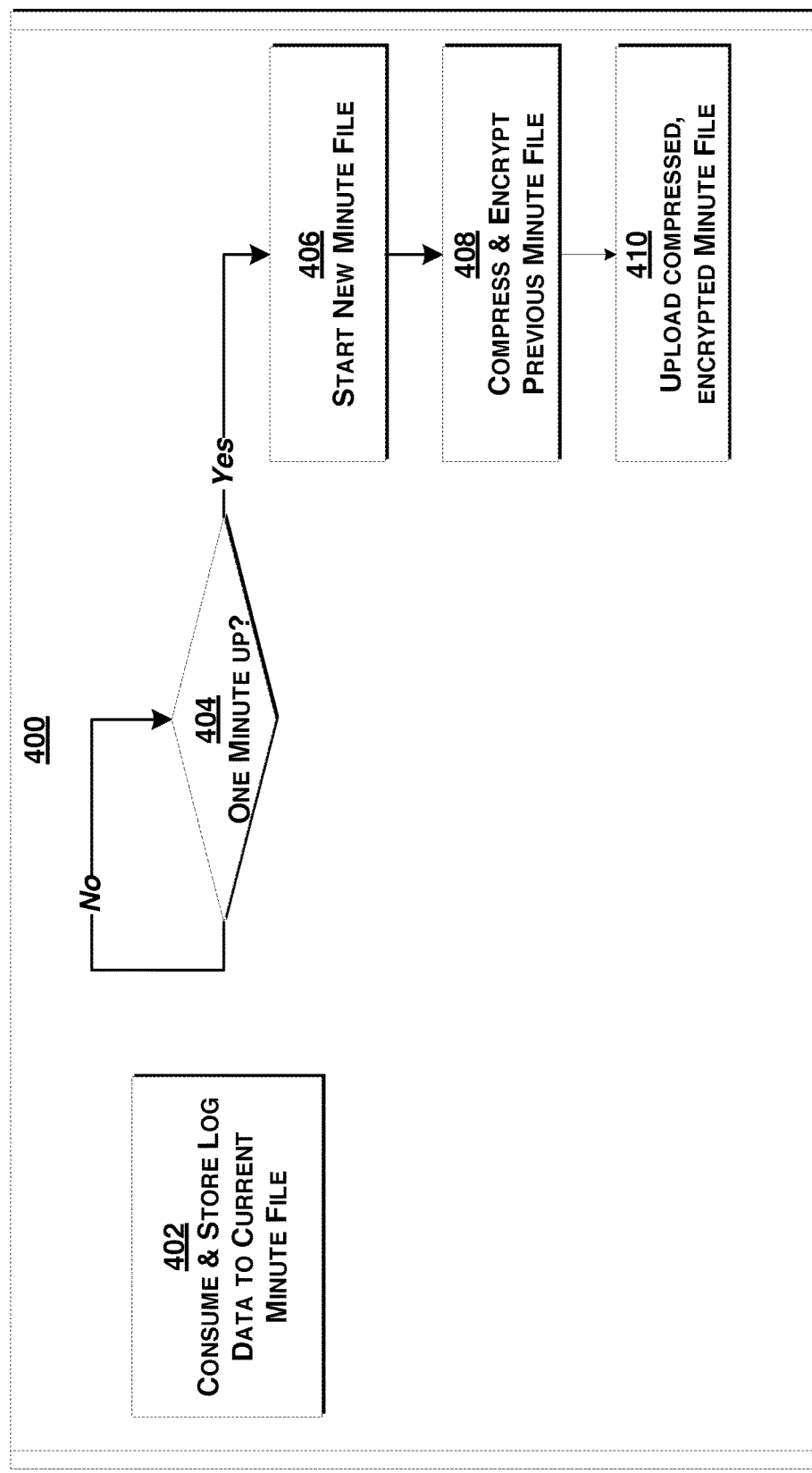
FIGS. 4A-4C are flowcharts showing exemplary operation of a log collection appliance and SIEM according to exemplary embodiments hereof.
Figure 4B:
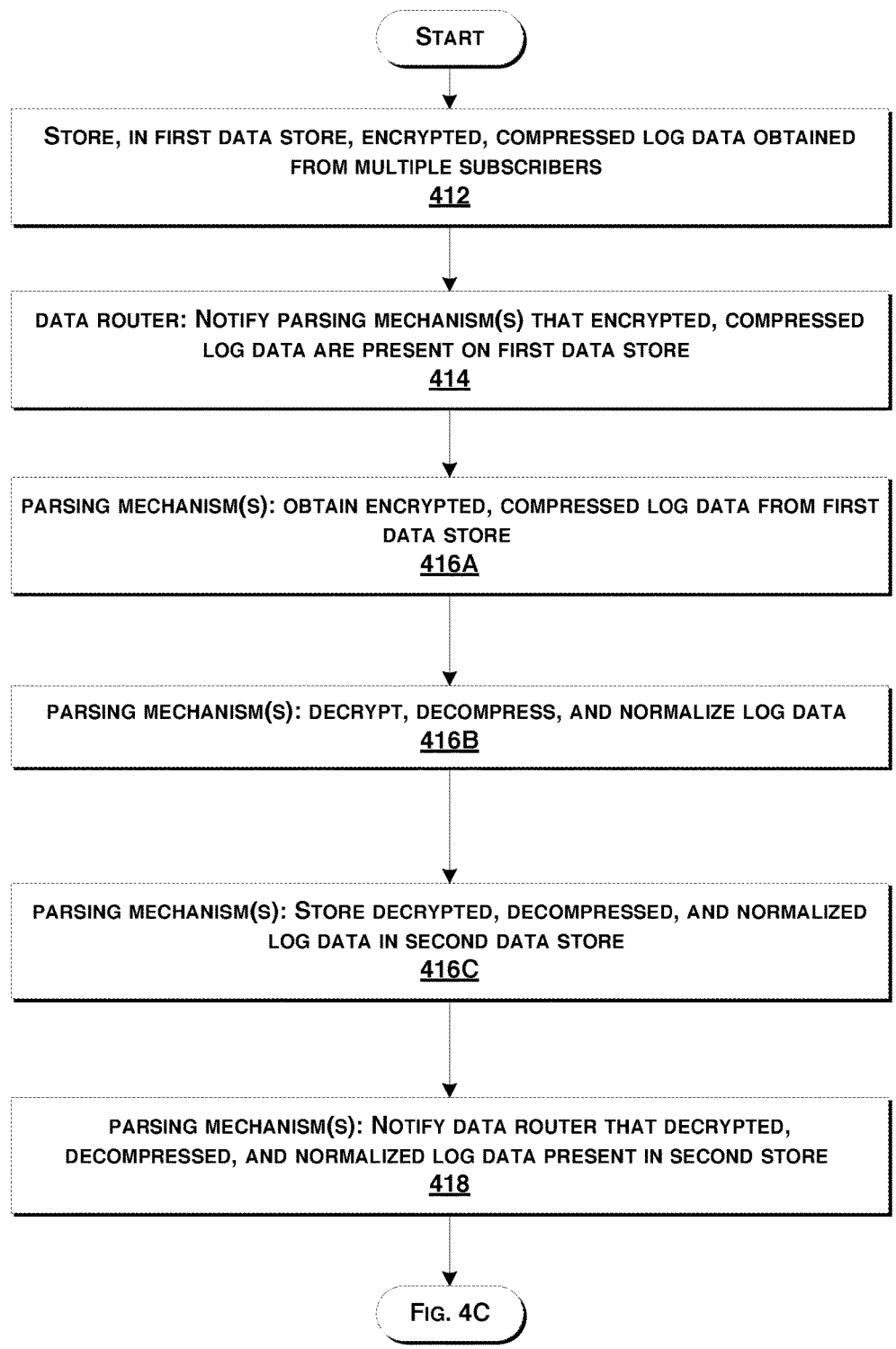

Operation 400 of an exemplary LCA is shown in the flowchart in FIG. 4A. For this example, it is assumed the that LCA uses one-minute files. That is, a new log file is started every minute and the previous log file is compressed, encrypted, and then uploaded to the data storage.

As shown in FIG. 4A, the LCA consumes and stores log data into the current minute file (at 402). At the same time, a timer determines if one minute has passed (at 404). If it is determined (at 404) that one minute has passed, then a new minute file is started (at 406). This new minute file will be the "current" minute file used to store data (at 402). The previous minute file is then compressed and encrypted (at 408), and the compressed and encrypted minute file is uploaded (at 410).

Those of skill in the art will understand, upon reading this description, that a different time granularity (instead of one minute) may be used (e.g., 30 seconds, 90 seconds, etc.). Preferably the time granularity is selected such that the compression and encryption processing may be complete before it has to start again for the next file.

The LCA's processing (400) is repeated while the LCA is running.

The buckets may act as long-term storage for customer compliance, and the data store 108 may offer different types of storage, depending on a customer's compliance needs (e.g. 1 year, 3 years, 90 days, etc.).

In a current implementation, the buckets 106 are Amazon S3 buckets.

Within the data store 108, each customer's data are uniquely identified.

A hashing algorithm may be used to scale out performance in the data store. In some implementations, each customer has a unique customer number, and data files are named using the customer number concatenated with a hash of the customer number along with time-based information (e.g., a time stamp)). As should be appreciated, different and/or other naming schemes may be used. However, a preferable naming scheme supports the distribution of incoming log data and allows the system to store large amounts of data in parallel.

Once files arrive in the data store 108 (on the various buckets 106), a simple notification service (SNS) generates a notification that is queued to a data router 110. The data router 110 includes a routing mechanism 112 with access to customer data 114. In this manner, data may be routed based on customer-specific requirements and/or based on what features to which customers have subscribed and/or which customers have requested.

The routing mechanism 112 may thus take the SNS data flow (from the LCAs 104) and provide it to various SIEM framework components based, at least in part, on customer selection, e.g., using customer-specified parameters.

SNS data may be sent from the data router 110 to a parsing queue 116. (414, FIG. 4B) Parsing containers 118 take SNS messages from the parsing queue 116, use the SNS messages to obtain the actual data (compressed and encrypted) from the appropriate bucket 106 in the data store 108, and then decrypt and decompress the data. (416A, 416B, FIG. 4B) As should be appreciated, using this scheme the router 110 only sees filenames of data to be processed and does not need to see the entire data file.

The parsing containers may also normalize the log data (after decryption and decompression). In some cases, the LCAs 104 may also perform some data normalization, although it should be appreciated that it is preferable to reduce their overhead.

The parsing containers 118 upload and store parsed (and normalized) data to a data store 120. (416C, FIG. 4B)

Figure 4C:
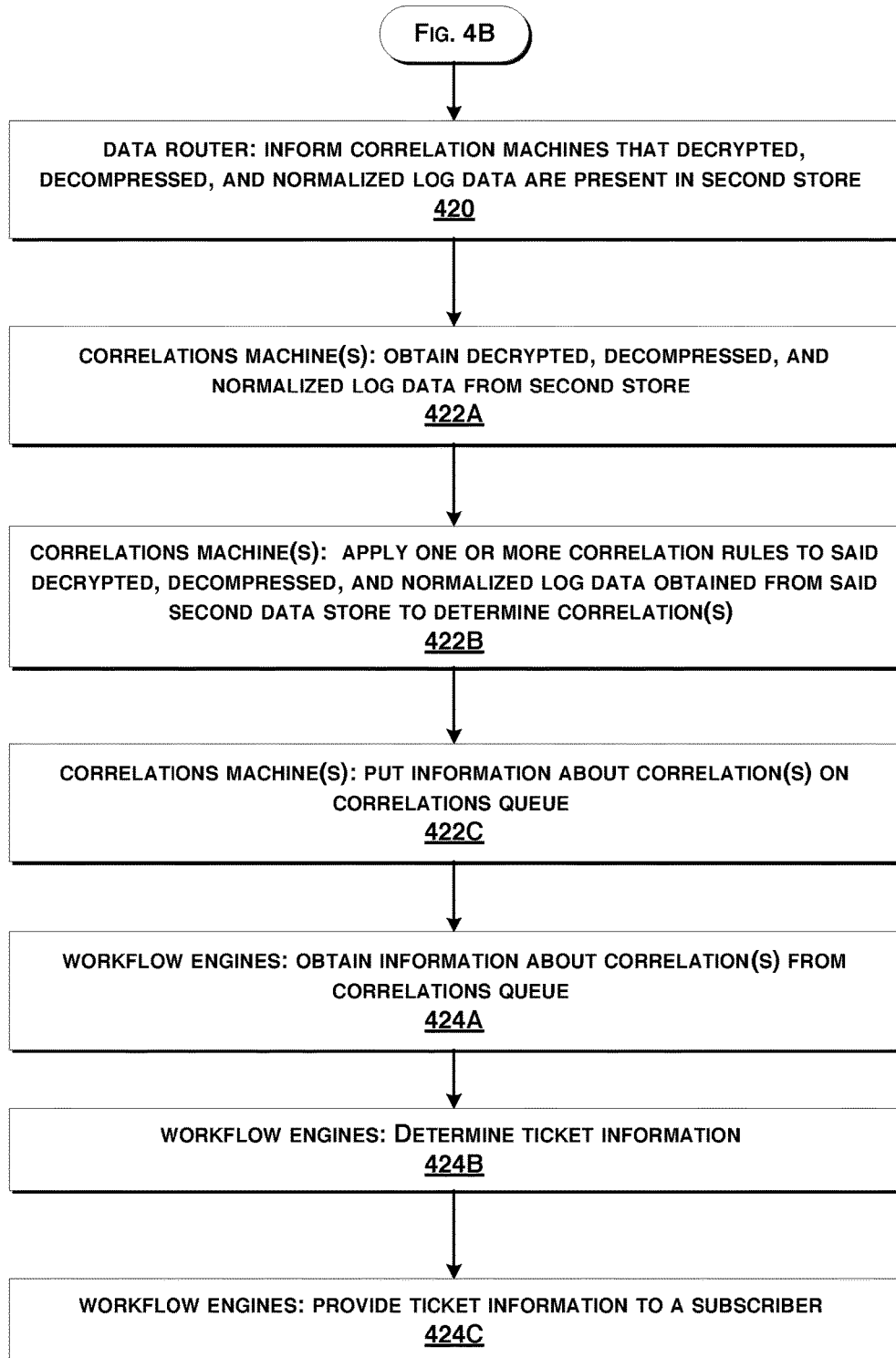

Once the parsed and normalized data are stored in data store 120, an SNS message may be sent to the router 110. (418, FIG. 4B) The router 110, using routing mechanism 112 and possibly customer data 114 may send the SNS message to an appropriate queue (e.g., parsed 122 or dedicated 124) for processing of the normalized parsed data by a correlation engine 126. (420, FIG. 4C)

The correlation engine 126 takes a message (e.g., an SNS message) of the appropriate queue (parsed 122 or dedicated 124), and pulls log information from the parsed logs (in data store 120). (422A, FIG. 4C)

The correlation engine 126 may include one or more general or shared correlation mechanisms 128 and one or more dedicated correlation mechanisms 130. In some cases, each customer will have their own correlation mechanism (either shared or general). Shared correlation mechanism(s) 128 use a shared library 132 of rules used to analyze the parsed log data. Each dedicated correlation mechanism 130 may include its own dedicated library 134 of correlation rules.

Customers may use the shared library 132 of correlation rules or they may choose to use a customer-specific correlation engine may pull from shared library and may have its own dedicated library.

The correlation engine 126 (essentially each correlation mechanism 128 or 130) detects events or anomalies and sends information about them off to a correlation queue 136. (422B, 422C, FIG. 4C)

One or more workflow engines 138 may obtain correlation information from the correlation queue 136 and may use that information to generate a ticket 140 to be provided to the appropriate customer 102. (424A, 424B, FIG. 4C) The workflow engine(s) 138 may obtain information from one or more external sources 142 (e.g., DNS servers, weather reports, etc.) as well as information from the data store 120.

The ticket 140 produced by the workflow engine(s) 138 may include information about related and/or historical events. For example, a ticket about failed login attempts may include information about similar failed attempts on other days and/or by other users.

The ticket 140 may be provided to the customer as a notification (e.g., by email or text messaging). (424C, FIG. 4C) In addition (or instead), a ticket 140 may be used to generate or cause automated feedback, including possible intervention, at the customer. Intervention may be provided, e.g., using one or more APIs on devices on the customer's network.

In some cases, the ticket 140 may cause or trigger the customer's LCA to collect different log information.

In some cases, the ticket 140 may cause or trigger customer devices to generate different log information or log information at different degrees of severity.

Figure 2:
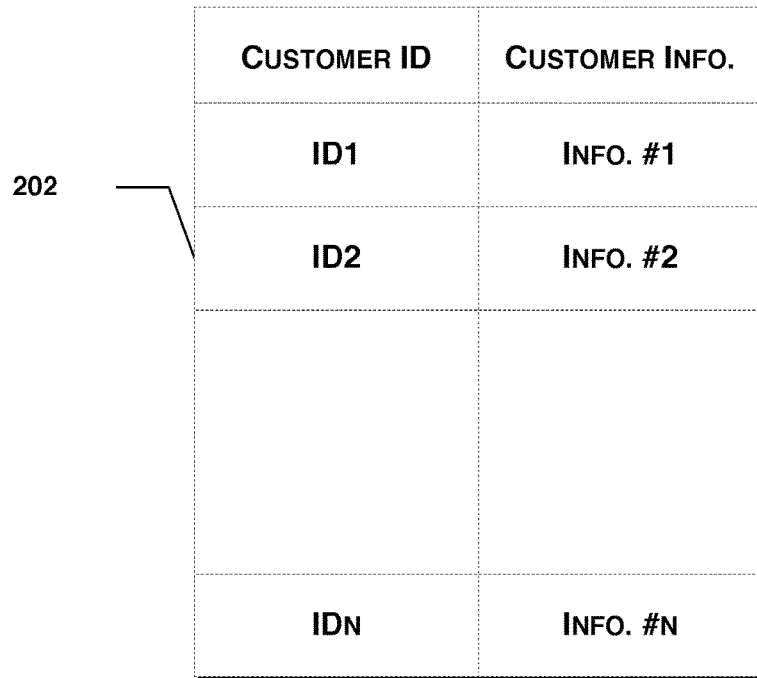
FIG. 2 depicts aspects of an exemplary data structure used in the framework of FIG. 1.

FIG. 2 shows aspects of the customer data 114 of FIG. 1. As shown in FIG. 2, the customer data 114 may include a table 202 that provides a mapping from customer IDs to corresponding customer information. With this data structure, the router mechanism 112 may use customer-specific information to make routing decisions. It should be appreciated that the table shown in FIG. 2 is merely an example, and different and/or other data structures may be used.

FIG. 3 shows a simplified view of the framework 100 of FIG. 1.

COMPUTING

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
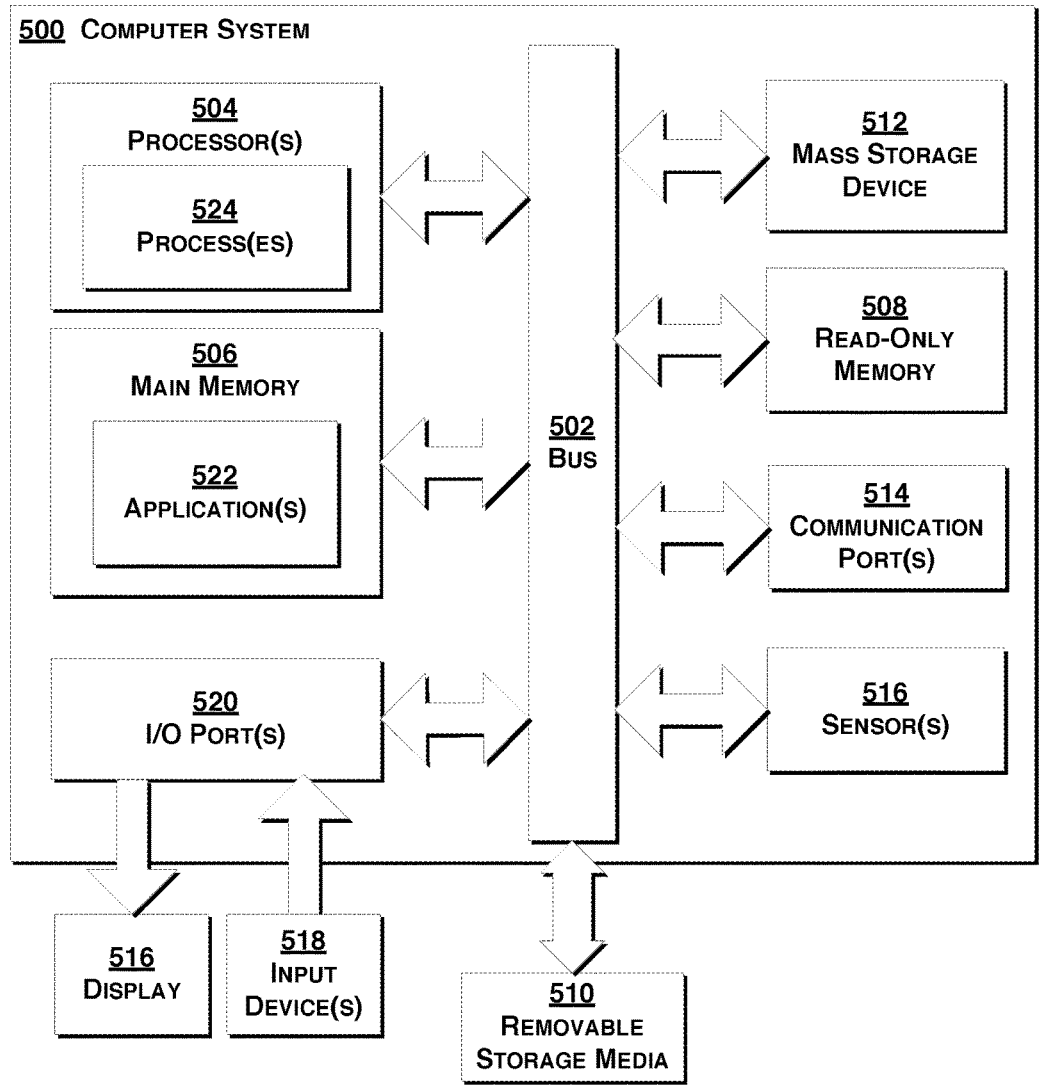
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 may include a bus 502 (i.e., interconnect), one or more processors 504, a main memory 506, read-only memory 508, removable storage media 510, mass storage 512, and one or more communications ports 514. As should be appreciated, components such as removable storage media are optional and are not necessary in all systems. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

While various embodiments have been described herein, other manners are contemplated.

As used in this description, the term "portion" means some or all. So, for example, "A portion of X" may include some of "X" or all of "X". In the context of a conversation, the term "portion" means some or all of the conversation.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,") and the like, is merely intended to better illustrate the invention and does not indicate a limitation on the scope of the invention unless specifically so claimed.

We claim:

1. A framework for security information and event management (SIEM), the framework comprising:
   at least one processor;
   memory, operatively connected to the at least one processor storing instructions that, when executed by the processor, cause the framework to perform operations:
   a first data store;
   one or more parsing mechanisms;
   one or more correlation machines; and
   one or more workflow engines,
   wherein said framework performs SIEM on behalf of multiple subscribers to said framework, and
   wherein said first data store is constructed and adapted to store log data obtained from at least some of said multiple subscribers, and
   wherein said one or more parsing mechanisms are constructed and adapted to obtain log data from said first data store and to normalize said log, and
   wherein said one or more correlations machines are constructed and adapted: to obtain normalized log data, and to apply one or more correlation rules to said normalized log data to determine one or more correlations, and to put information about said one or more correlations on a correlations queue; and
   wherein said one or more workflow engines are constructed and adapted to obtain said information about said one or more correlations from said correlations queue and to determine ticket information based on said information about said one or more correlations, and to provide said ticket information to a subscriber of said multiple subscribers.

2. The framework of claim 1, wherein a data router informs said one or more correlation machines that normalized log data is by putting a message on a parsed queue.

3. The framework of claim 2, wherein the parsed message comprises a Simple Notification Service (SNS) message on the parsed queue.

4. The framework of claim 1, wherein the first data obtains log data obtained from one or more log collection appliances (LCAs) associated with said multiple subscribers.

5. The framework of claim 4, wherein each particular LCA is associated with a corresponding particular subscriber of said multiple subscribers.

6. The framework of claim 1, wherein said first data store is constructed and adapted to store data for each subscriber separately from data from each other subscriber.

7. The framework of claim 1, wherein a data router informs said one or more correlation machines of normalized log data present, based on subscriber-specific criteria.

8. The framework of claim 1, wherein the one or more correlation machines include at least one subscriber-dedicated correlation machine.

9. The framework of claim 1, wherein each subscriber has a corresponding correlation machine.

10. The framework of claim 1, wherein the one or more workflow engines determine said ticket information based on said information about said one or more correlations, and on other information.

11. The framework of claim 10, wherein the other information comprises information from one or more external systems.

12. The framework of claim 1, wherein said ticket information is used to generate and/or cause automated intervention at the subscriber.

13. The framework of claim 12, wherein said intervention is provided using one or more APIs on devices on the subscriber's network.

14. A method operable in a framework for security information and event management (SIEM), said framework supporting SIEM on behalf of multiple subscribers to said framework, the framework having: a first data store; one or more parsing mechanisms; one or more correlation machines; and one or more workflow engines,
   wherein the method comprises:
   storing, in said first data, encrypted, compressed log data obtained from at least some of said multiple subscribers;
   said one or more parsing mechanisms obtaining data from said first data store and normalizing said log data,
   said one or more correlations machines: obtaining normalized log data, and applying one or more correlation rules to said normalized log data to determine one or more correlations, and putting information about said one or more correlations on a correlations queue; and
   said one or more workflow engines obtaining said information about said one or more correlations from said correlations queue and determining ticket information based on said information about said one or more correlations, and providing said ticket information to a subscriber of said multiple subscribers.

15. The method of claim 14, wherein a data router informs said one or more correlation machines that normalized log data are present by putting a message on a parsed queue.

16. The method of claim 15, wherein the parsed message comprises a Simple Notification Service (SNS) message on the parsed queue.

17. The method of claim 14, wherein the first data obtains log data obtained from one or more log collection appliances (LCAs) associated with said multiple subscribers.

18. The method of claim 17, wherein each particular LCA is associated with a corresponding particular subscriber of said multiple subscribers.

19. The method of claim 14, wherein said first data store is constructed and adapted to store data for each subscriber separately from data from each other subscriber.

20. The method of claim 14, wherein a data router informs said one or more correlation machines of normalized log data are present, based on subscriber-specific criteria.

21. The method of claim 14, wherein the one or more correlation machines include at least one subscriber-dedicated correlation machine.

22. The method of claim 14, wherein each subscriber has a corresponding correlation machine.

23. The method of claim 14, wherein the one or more workflow engines determine said ticket information based on said information about said one or more correlations, and on other information.

24. The method of claim 23, wherein the other information comprises information from one or more external systems.

25. The method of claim 14, wherein said ticket information is used to generate and/or cause automated intervention at the subscriber.

26. The method of claim 25, wherein said intervention is provided using one or more APIs on devices on the subscriber's network.

27. A non-transitory computer-readable medium with one or more computer programs stored therein that, when executed by one or more processors of a device, cause the one or more processors to perform the operations of the method of claim 14.

* * * * *